(No Model.) 2 Sheets—Sheet 1.
H. T. HOPKINS.
GRAIN DRIER.
No. 487,738. Patented Dec. 13, 1892.
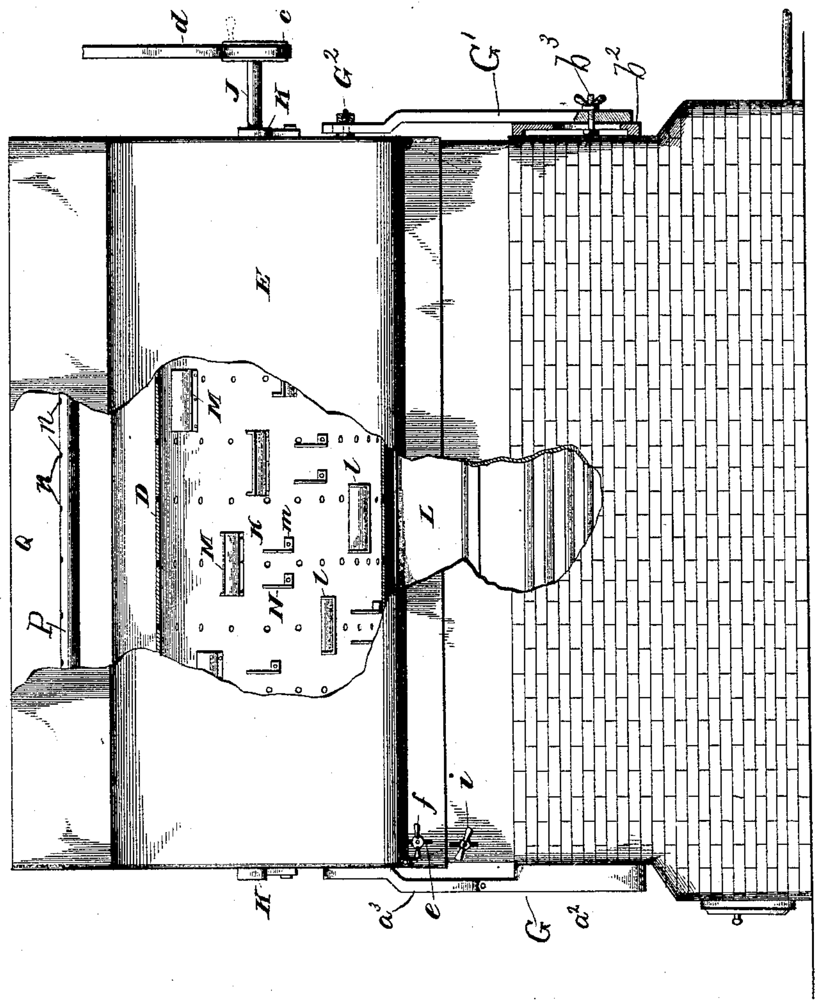
Witnesses
John Dinnie
Alfred T. Gage
Inventor
Henry T. Hopkins
By W. G. Henderson
his Attorney.
THE NORRIS PETERS CO., PHOTO-LITHO., WASHINGTON, D. C.

(No Model.) 2 Sheets—Sheet 2.
H. T. HOPKINS.
GRAIN DRIER.
No. 487,738. Patented Dec. 13, 1892.
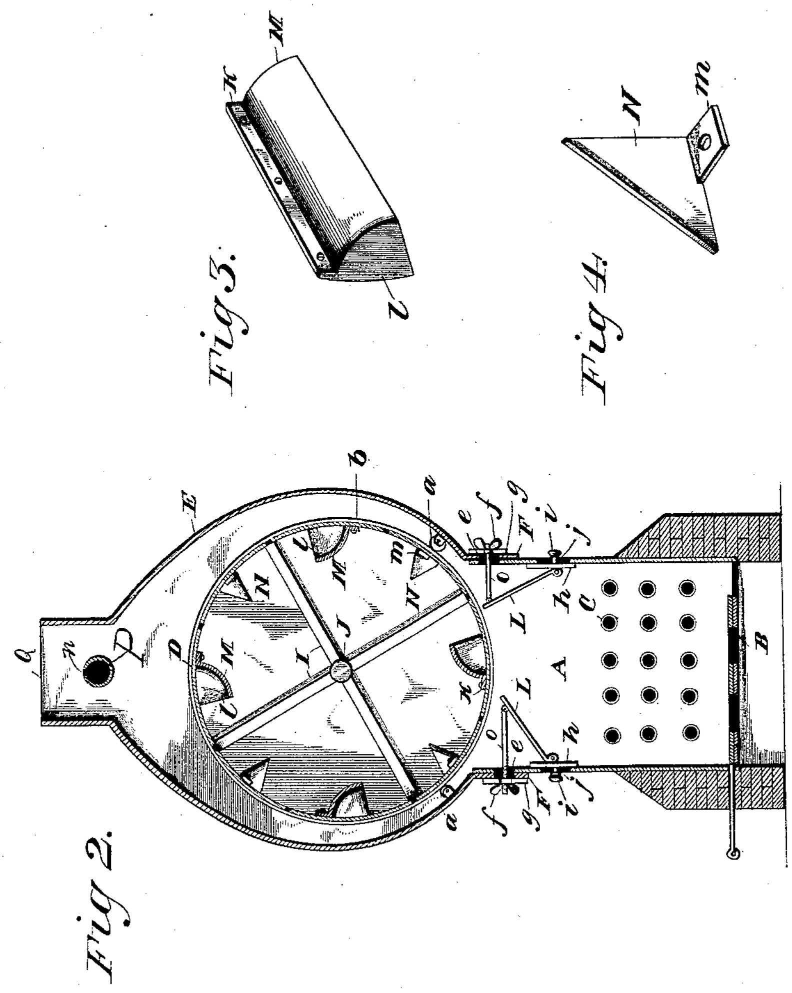
Witnesses
John Imirie
Alfred T. Gage.
Inventor
Henry T. Hopkins
By W. Henderson his Attorney.
THE NORRIS PETERS CO., PHOTO-LITHO., WASHINGTON, D. C.

UNITED STATES PATENT OFFICE.

HENRY T. HOPKINS, OF CAPE VINCENT, ASSIGNOR OF ONE-HALF TO ERSKINE M. PARMELEE, OF DANSVILLE, NEW YORK.

GRAIN-DRIER.

SPECIFICATION forming part of Letters Patent No. 487,738, dated December 13, 1892.

Application filed September 8, 1891. Serial No. 405,082. (No model.)

*To all whom it may concern:*

Be it known that I, HENRY T. HOPKINS, a citizen of the United States, residing at Cape Vincent, in the county of Jefferson and State of New York, have invented certain new and useful Improvements in Grain-Driers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to driers for materials of different kinds, but more particularly for grain.

It has for its object to provide a revolving cylinder with a series of knives and also with series of lifters, each of a construction best to serve their purposes and each arranged with reference to one another as to cause, practically, an even distribution of the material throughout the length of the cylinder, and thus equalize the power required to propel the cylinder, and also at the same time to effectively break up any tendency of the material to pack or cake and insure some of the material continuously falling through a current of heated air.

Another object is to provide for concentrating or disseminating the heat on the lower surface of the revolving cylinder, and thus to regulate the application of the heat to the existing conditions.

It also has for its object to provide for producing an increased draft in the upper portion of the drum or casing inclosing the cylinder, so as to expeditiously carry off the moisture that may be thrown off from the material.

It has, further, for its object to improve the construction of the drier generally so as to increase its efficiency, as will hereinafter more at large appear.

To the accomplishment of the foregoing objects the invention consists in the construction and combination of parts hereinafter particularly described and claimed, reference being had to the accompanying drawings, forming a part hereof, and in which—

Figure 1 is a side view of the drier with parts broken away and other parts in section. Fig. 2 is a cross-section through the drier; Fig. 3, a perspective of one of the lifters detached from the drier; Fig. 4, a perspective of one of the knives or cutters detached from the drier.

In the drawings the letter A designates a chamber or compartment of metal or other material in which air admitted through valve-controlled openings B is heated by any suitable means—for instance, by hot-air or steam pipes C, which will communicate with any suitable furnace or boiler. Over the top of the hot-air chamber is supported a foraminous cylinder D, which is inclosed in a drum or casing E. The drum or casing E has side wings F, which fit down over the sides of the chamber A, so as to allow the casing or drum to be raised or lowered without uncovering the sides of the hot-air chamber. This drum is supported at its ends by the standards G and G′. The standard G consists of a main portion $a^2$, secured to any suitable support, as the base of the drier, and the hinged upper portion $a^3$, the upper end of the latter being secured to the drum by screws or rivets. The standard G′ is adjustably secured at the lower end to the plate $b^2$ by means of the screw $b^3$ and its thumb-nut, the screw passing through the standard and a slot in the plate. The upper end of the standard is slotted longitudinally and is adjustably connected with the drum by means of the pin $G^3$, which is rigidly fixed to the drum and registers with the slot of the standard. The outer end of the pin is threaded and carries thereon a thumb-nut, by means of which and the collar surrounding the inner end of the pin between the drum and the standard the latter can be clamped. By constructing the standard in the manner described the drum may be adjusted relatively to the hot-air chamber. Friction-rollers $a$ are secured to the inner side of the drum to serve to keep the cylinder in its proper position. The cylinder at the points where it rests upon the rollers will be provided with rings or bands $b$ to bear upon the rollers and at each end may have the spiders I fitted within the same. These spiders may be keyed to the longitudinal shaft J, which is journaled to turn in suitable boxings K. The shaft may have power transmitted to it through a pulley $c$ and belt $d$ to revolve the cylinder; or the cylinder may be revolved by any other well-known construction and application of mechanism. By adjusting the foraminous cylinder and its inclosing drum together the cylinder can be placed at any angle of inclination desired or moved the desired distance from the heating-pipes in the hot-air chamber without changing the distance or space between the foraminous cylinder and the walls of its inclosing drum and so the distribution of heat around the cylinder will be relatively the same in all adjustments of the cylinder.

In order that the heat may be concentrated against a limited portion of the bottom of the foraminous cylinder or disseminated over a greater portion thereof, I provide movable plates or valves L, which can be thrown in toward each other, and thus made to converge at their upper ends, so that the heat will be directed against the point desired. Either or both of the valves may be moved, and in that way a very complete control of the heat is obtained. The valves may be moved back and forth by any suitable means—for instance, by an arm or rod $o$, hinged at one end to the valve and extended through a vertical slot $e$ in the side of the hot-air chamber and provided with a thumb-nut $f$ to secure the valve at its adjustment. The slot through which the rod passes may be covered by a slide $g$, which will move in vertical line and close the slot, so that the hot air will not escape. It is preferred to hinge the valves L at their lower ends to vertically-moving slides $h$, which can be held to their vertical adjustments by clamping them to the sides of the chamber by thumb-nuts $i$, which screw on the pins $j$, which project from the slides and through slots in the walls of the chamber. By such construction the valves can be adjusted to or from the bottom of the foraminous cylinder and the space for the passage of the hot-air currents thus regulated, so that the whole volume of heated air can be directed through the bottom of the cylinder and the material contained in it, or a portion may be allowed to pass up the sides through the space between the walls of the cylinder and its inclosing drum or casing.

The inner circumference of the foraminous cylinder is provided with a series of lifts or elevators M, arranged not in parallel lines, but in sections in an ascending scale or step-like order lengthwise of the cylinder, and as illustrated, so that not only will some portion of the material be continuously falling down through the ascending air-currents, but the weight of the bulk of the grain will be so distributed throughout the cylinder as to equalize the force or power required to turn the cylinder. The lifts or elevators are formed with a concave or curved or straight face on their ascending side and provided with a lip or shoulder $k$, through which rivets or screws pass to secure them to the inner circumference of the cylinder. To strengthen and brace the lifts, they are provided with end flanges $l$, which when resting on the surface of the cylinder will aid in supporting the lifts, and thus take off the shoulders or lips $k$ the strain which otherwise would be upon them.

To prevent any packing of the material to which there is usually a tendency when the material is damp, I attach to the inside of the cylinder a series of knives or blades N. These knives are preferably of the construction shown, as they are then stronger and more efficient and at the same time light—that is, they are formed with a laterally-projecting lip $m$, by means of which and rivets or screws they are secured to the cylinder and their front or cutting edges are made straight, while their rear edges are inclined. They are arranged by sections in step order on an ascending scale and preferably so that each section will extend from near the end of one lift outward under the lift next above, as illustrated. This construction and arrangement give the most efficient service in breaking up any cakes or conglomerate mass of material that may be forming and will keep the mass in a state of disintegration.

The drum E, which incloses the cylinder D, converges at its top and terminates in a flue O, extending the length of the drum. The converging walls of the drum form a chamber or space above the cylinder, which is the deepest above the central portion of the top of the cylinder and diminishes to each side of the cylinder and which opens into an elongated flue, and as a result of such construction the air is to some extent sucked upward, and a free egress for the air heavily laden with moisture is provided throughout the length of the cylinder and a quicker and more thorough drying of the material follows.

For the purpose of inducing a strong upward suction or blast through the flue Q a pipe P may be extended through the flue lengthwise of the cylinder and provided with a series of openings $n$ along its top, so that jets of steam or of compressed air issuing through said openings will create an upward suction in the flue, so as to more quickly carry off the moistened air.

I have described what I consider to be the best construction of the several parts; but it will be understood that departures may be made from the details specified without departing from my invention. It is also to be understood that the dimensions and proportions of the several parts will in constructing the machine be controlled by the particular use to be made of the drier.

Having described my invention and set forth its merits, what I claim is—

1. In a drier, the combination, with a vertically-adjustable cylinder to contain the material to be dried and a hot-air chamber below the same, of a vertically-adjustable drum or casing around said cylinder and flanges at the junction of the walls of said drum and said chamber and lapping the walls of one of said parts, so as to permit the adjustment of the drum without uncovering the joint between it and the hot-air chamber, substantially as and for the purposes set forth.

2. In a drier, the combination of the hot-air chamber, the drum mounted above the said chamber, the foraminous cylinder rotatably mounted within the drum, and the valves mounted within the upper part of the hot-air chamber, each being hinged at its lower edge to a vertically-movable plate *h* and at its upper edge to the adjusting-rod *o*, extending to the interior of the chamber, substantially as described.

3. In a drier, the combination of the drum, the hot-air chamber situated beneath the drum, the foraminous cylinder rotatably mounted within the said drum, the elevators arranged within the said cylinder in lines extending around the same substantially spirally, and the blades similarly arranged between the elevators, so that a pair of them will succeed each elevator in its revolution, substantially as described.

In testimony whereof I affix my signature in presence of two witnesses.

HENRY T. HOPKINS.

Witnesses:
MARSHALL S. CORNOIR,
JOSEPH GREGOR.